US008225369B2

(12) United States Patent
Nathan et al.

(10) Patent No.: US 8,225,369 B2
(45) Date of Patent: Jul. 17, 2012

(54) HOME DIGITAL AUDIOVISUAL INFORMATION RECORDING AND PLAYBACK SYSTEM

(75) Inventors: Guy Nathan, Yerres (FR); Tony Mastronardi, Pierrefonds (CA)

(73) Assignee: TouchTunes Music Corporation, New York, NY (US)

( * ) Notice: Subject to any disclaimer, the term of this patent is extended or adjusted under 35 U.S.C. 154(b) by 1292 days.

(21) Appl. No.: 11/979,179

(22) Filed: Oct. 31, 2007

(65) Prior Publication Data

US 2008/0069545 A1      Mar. 20, 2008

Related U.S. Application Data

(63) Continuation of application No. 09/642,928, filed on Aug. 22, 2000, now Pat. No. 7,424,731, which is a continuation of application No. 08/817,437, filed as application No. PCT/FR95/01336 on Oct. 12, 1995, now Pat. No. 6,182,126.

(30) Foreign Application Priority Data

Oct. 12, 1994   (FR) .......................... PCT/FR94/01185

(51) Int. Cl.
*H04N 7/16* (2011.01)
(52) U.S. Cl. ........................ 725/133; 725/141
(58) Field of Classification Search .................. 725/87, 725/89, 90, 133, 141
See application file for complete search history.

(56) References Cited

U.S. PATENT DOCUMENTS

| | | | |
|---|---|---|---|
| 3,807,541 A | 4/1974 | Kortenhaus | |
| 3,982,620 A | 9/1976 | Kortenhaus | |
| 4,008,369 A | 2/1977 | Theurer et al. | |
| 4,186,438 A | 1/1980 | Benson et al. | |
| 4,232,295 A | 11/1980 | McConnell | |
| 4,335,809 A | 6/1982 | Wain | |
| 4,335,908 A | 6/1982 | Burge | |
| 4,356,509 A | 10/1982 | Skerlos et al. | |
| 4,369,442 A | 1/1983 | Werth et al. | |
| 4,375,287 A | 3/1983 | Smith | |
| 4,412,292 A | 10/1983 | Sedam et al. | |
| 4,413,260 A | 11/1983 | Siegel et al. | |
| 4,521,014 A | 6/1985 | Sitrick | |
| 4,528,643 A | 7/1985 | Freeny, Jr. | |
| 4,558,413 A | 12/1985 | Schmidt | |

(Continued)

FOREIGN PATENT DOCUMENTS

DE             3406058        8/1985

(Continued)

OTHER PUBLICATIONS

"Ecast Forges Landmark International Technology Partnership", Business Wire at www.findarticles.com/cf_0/m0EIN/2000_July_25/63663604/print.jhtml, 2 pages, Jul. 25, 2000.

(Continued)

*Primary Examiner* — Hunter B Lonsberry
(74) *Attorney, Agent, or Firm* — Nixon & Vanderhye PC

(57) ABSTRACT

A method for operating a home digital audiovisual information recording and playback apparatus. The method includes: displaying menus with user-selectable system operation options; enabling a selection of desired audiovisual information for reproduction; effecting payment for the desired audiovisual information; inputting a user personal identification number; and downloading, from a main server, the desired audiovisual information after payment has been effected and a valid personal identification has been received.

18 Claims, 12 Drawing Sheets

U.S. PATENT DOCUMENTS

| | | | |
|---|---|---|---|
| 4,572,509 A | 2/1986 | Sitrick | |
| 4,577,333 A | 3/1986 | Lewis et al. | |
| 4,582,324 A | 4/1986 | Koza et al. | |
| 4,588,187 A | 5/1986 | Dell | |
| 4,593,904 A | 6/1986 | Graves | |
| 4,597,058 A | 6/1986 | Izumi et al. | |
| 4,636,951 A | 1/1987 | Harlick | |
| 4,652,998 A | 3/1987 | Koza et al. | |
| 4,654,799 A | 3/1987 | Ogaki et al. | |
| 4,658,093 A | 4/1987 | Hellman | |
| 4,667,802 A | 5/1987 | Verduin et al. | |
| 4,674,055 A | 6/1987 | Ogaki et al. | |
| 4,675,538 A | 6/1987 | Epstein | |
| 4,677,311 A | 6/1987 | Morita | |
| 4,677,565 A | 6/1987 | Ogaki | |
| 4,703,465 A | 10/1987 | Parker | |
| 4,704,725 A | 11/1987 | Harvey et al. | |
| 4,707,804 A | 11/1987 | Leal | |
| 4,722,053 A | 1/1988 | Dubno | |
| 4,761,684 A | 8/1988 | Clark et al. | |
| 4,766,581 A | 8/1988 | Korn et al. | |
| 4,787,050 A | 11/1988 | Suzuki | |
| 4,792,849 A | 12/1988 | McCalley | |
| 4,807,052 A | 2/1989 | Amano | |
| 4,811,325 A | 3/1989 | Sharples, Jr. et al. | |
| 4,814,972 A | 3/1989 | Winter et al. | |
| 4,825,054 A | 4/1989 | Rust | |
| 4,829,570 A | 5/1989 | Schotz | |
| 4,852,154 A | 7/1989 | Lewis et al. | |
| 4,857,714 A | 8/1989 | Sunyich | |
| 4,868,832 A | 9/1989 | Marrington | |
| 4,885,694 A | 12/1989 | Pray et al. | |
| 4,905,279 A | 2/1990 | Nishio | |
| 4,920,432 A | 4/1990 | Eggers | |
| 4,922,420 A | 5/1990 | Nakagawa et al. | |
| 4,924,378 A | 5/1990 | Hershey | |
| 4,926,485 A | 5/1990 | Yamashita | |
| 4,937,807 A | 6/1990 | Weitz et al. | |
| 4,949,187 A | 8/1990 | Cohen | |
| 4,953,159 A | 8/1990 | Hayden et al. | |
| 4,956,768 A | 9/1990 | Sidi et al. | |
| 4,958,835 A | 9/1990 | Tashiro et al. | |
| 4,977,593 A | 12/1990 | Ballance | |
| 4,999,806 A | 3/1991 | Chernow | |
| 5,008,814 A | 4/1991 | Mathur | |
| 5,012,121 A | 4/1991 | Hammond | |
| 5,027,426 A | 6/1991 | Chiocca | |
| 5,041,921 A | 8/1991 | Scheffler | |
| 5,046,093 A | 9/1991 | Wachob | |
| 5,053,758 A | 10/1991 | Cornett et al. | |
| 5,058,089 A | 10/1991 | Yoshimaru et al. | |
| 5,077,607 A | 12/1991 | Johnson et al. | |
| 5,081,534 A | 1/1992 | Geiger et al. | |
| 5,101,499 A | 3/1992 | Streck et al. | |
| 5,106,097 A | 4/1992 | Levine | |
| 5,117,407 A | 5/1992 | Vogel | |
| 5,138,712 A | 8/1992 | Corbin | |
| 5,148,159 A | 9/1992 | Clark et al. | |
| 5,155,847 A | 10/1992 | Kirouac | |
| 5,163,131 A | 11/1992 | Row | |
| 5,166,886 A | 11/1992 | Molnar | |
| 5,172,413 A | 12/1992 | Bradley et al. | |
| 5,180,309 A | 1/1993 | Egnor | |
| 5,189,630 A | 2/1993 | Barstow et al. | |
| 5,191,573 A | 3/1993 | Hair | |
| 5,191,611 A | 3/1993 | Lang | |
| 5,192,999 A | 3/1993 | Graczyk | |
| 5,197,094 A | 3/1993 | Tillery | |
| 5,203,028 A | 4/1993 | Shiraishi | |
| 5,210,854 A | 5/1993 | Beaverton et al. | |
| 5,214,761 A | 5/1993 | Barrett et al. | |
| 5,222,134 A | 6/1993 | Waite et al. | |
| 5,228,015 A | 7/1993 | Arbiter et al. | |
| 5,237,157 A | 8/1993 | Kaplan | |
| 5,237,322 A | 8/1993 | Heberle | |
| 5,239,480 A | 8/1993 | Huegel | |
| 5,250,747 A | 10/1993 | Tsumura | |
| 5,252,775 A | 10/1993 | Urano | |
| 5,260,999 A | 11/1993 | Wyman | |
| 5,261,104 A | 11/1993 | Bertram et al. | |
| 5,262,875 A | 11/1993 | Mincer et al. | |
| 5,276,866 A | 1/1994 | Paolini | |
| 5,278,904 A | 1/1994 | Servi | |
| 5,282,028 A | 1/1994 | Johnson et al. | |
| 5,289,476 A | 2/1994 | Johnson et al. | |
| 5,289,546 A | 2/1994 | Hetherington | |
| 5,315,161 A | 5/1994 | Robinson | |
| 5,315,711 A | 5/1994 | Barone et al. | |
| 5,319,455 A | 6/1994 | Hoarty et al. | |
| 5,321,846 A | 6/1994 | Yokota et al. | |
| 5,327,230 A | 7/1994 | Dockery | |
| 5,339,095 A | 8/1994 | Redford | |
| 5,339,413 A | 8/1994 | Koval | |
| 5,341,350 A | 8/1994 | Frank et al. | |
| 5,355,302 A | 10/1994 | Martin et al. | |
| 5,357,276 A | 10/1994 | Banker et al. | |
| 5,369,778 A | 11/1994 | SanSoucie | |
| 5,375,206 A | 12/1994 | Hunter | |
| 5,386,251 A | 1/1995 | Movshovich | |
| 5,389,950 A | 2/1995 | Bouton | |
| 5,404,505 A | 4/1995 | Levinson | |
| 5,406,634 A | 4/1995 | Anderson et al. | |
| 5,408,417 A | 4/1995 | Wilder | |
| 5,410,326 A | 4/1995 | Goldstein | |
| 5,410,703 A | 4/1995 | Nilsson et al. | |
| 5,418,713 A | 5/1995 | Allen | |
| 5,420,923 A | 5/1995 | Beyers | |
| 5,428,252 A | 6/1995 | Walker | |
| 5,428,606 A | 6/1995 | Moskowitz | |
| 5,431,492 A | 7/1995 | Rothschild | |
| 5,440,632 A | 8/1995 | Bacon et al. | |
| 5,444,499 A | 8/1995 | Saitoh | |
| 5,445,295 A | 8/1995 | Brown | |
| 5,455,619 A | 10/1995 | Truckenmiller et al. | |
| 5,455,926 A | 10/1995 | Keele | |
| 5,457,305 A | 10/1995 | Akel | |
| 5,465,213 A | 11/1995 | Ross | |
| 5,467,326 A | 11/1995 | Miyashita et al. | |
| 5,469,370 A | 11/1995 | Ostrover et al. | |
| 5,469,573 A | 11/1995 | McGill et al. | |
| 5,471,576 A | 11/1995 | Yee | |
| 5,475,835 A | 12/1995 | Hickey | |
| 5,481,509 A * | 1/1996 | Knowles | 386/224 |
| 5,487,167 A | 1/1996 | Dinallo et al. | |
| 5,489,103 A | 2/1996 | Okamoto | |
| 5,495,610 A | 2/1996 | Shing | |
| 5,496,178 A | 3/1996 | Back | |
| 5,499,921 A | 3/1996 | Sone | |
| 5,511,000 A | 4/1996 | Kaloi | |
| 5,513,117 A | 4/1996 | Small | |
| 5,515,173 A | 5/1996 | Mankovitz et al. | |
| 5,519,435 A | 5/1996 | Anderson | |
| 5,519,457 A | 5/1996 | Nishigaki et al. | |
| 5,521,631 A | 5/1996 | Budow et al. | |
| 5,521,918 A | 5/1996 | Kim | |
| 5,521,922 A | 5/1996 | Fujinami et al. | |
| 5,523,781 A | 6/1996 | Brusaw | |
| 5,528,732 A | 6/1996 | Klotz | |
| 5,532,734 A | 7/1996 | Goertz | |
| 5,546,039 A | 8/1996 | Hewitt et al. | |
| 5,548,729 A | 8/1996 | Akiyoshi | |
| 5,550,577 A | 8/1996 | Verbiest | |
| 5,554,968 A | 9/1996 | Lee | |
| 5,555,244 A | 9/1996 | Gupta | |
| 5,557,541 A | 9/1996 | Schulhof | |
| 5,557,724 A * | 9/1996 | Sampat et al. | 725/43 |
| 5,559,505 A | 9/1996 | McNair | |
| 5,559,549 A | 9/1996 | Hendricks | |
| 5,561,709 A | 10/1996 | Remillard | |
| 5,565,908 A | 10/1996 | Ahmad | |
| 5,566,237 A | 10/1996 | Dobbs | |
| 5,570,363 A | 10/1996 | Holm | |
| 5,578,999 A | 11/1996 | Matsuzawa et al. | |
| 5,579,404 A | 11/1996 | Fielder et al. | |
| 5,583,561 A | 12/1996 | Baker et al. | |
| 5,583,937 A | 12/1996 | Ullrich et al. | |
| 5,583,994 A | 12/1996 | Rangan | |

| Patent | Date | Name |
|---|---|---|
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin et al. |
| 5,596,702 A | 1/1997 | Stucka et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankovitz |
| 5,708,811 A | 1/1998 | Arendt |
| 5,712,976 A | 1/1998 | Falcon |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,751,336 A | 5/1998 | Aggarwal et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choquier |
| 5,774,672 A | 6/1998 | Funahashi et al. |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,193 A | 3/1999 | Takahashi |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Bleidt |
| 5,923,885 A | 7/1999 | Johnson |
| 5,926,531 A | 7/1999 | Petite |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,963,916 A | 10/1999 | Kaplan |
| 5,966,495 A | 10/1999 | Takahashi |
| 5,978,855 A | 11/1999 | Metz |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |

| | | |
|---|---|---|
| 6,151,077 A | 11/2000 | Vogel et al. |
| 6,151,634 A | 11/2000 | Glasser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,227 B1 | 4/2001 | Goldstein et al. |
| 6,219,692 B1 | 4/2001 | Stiles |
| 6,223,209 B1 | 4/2001 | Watson |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Owens |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,356,971 B1 | 3/2002 | Katz et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,130 B1 | 9/2002 | Grapes |
| 6,449,688 B1 | 9/2002 | Peters et al. |
| 6,470,496 B1 | 10/2002 | Kato et al. |
| 6,488,508 B2 | 12/2002 | Okamoto |
| 6,490,570 B1 | 12/2002 | Numaoka |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,789,215 B1 | 9/2004 | Rupp et al. |
| 6,816,578 B1 | 11/2004 | Kredo et al. |
| 6,898,161 B1 | 5/2005 | Nathan |
| 6,904,592 B1 | 6/2005 | Johnson |
| 6,928,653 B1 | 8/2005 | Ellis et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,107,109 B1 | 9/2006 | Nathan et al. |
| 7,124,194 B2 | 10/2006 | Nathan et al. |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,293,277 B1 | 11/2007 | Nathan |
| 7,356,831 B2 | 4/2008 | Nathan |
| 7,406,529 B2 | 7/2008 | Reed |
| 7,424,731 B1 | 9/2008 | Nathan et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,749,083 B2 | 7/2010 | Nathan et al. |
| 7,757,264 B2 | 7/2010 | Nathan |
| 7,783,774 B2 | 8/2010 | Nathan et al. |
| 7,793,331 B2 | 9/2010 | Nathan et al. |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0129036 A1 | 9/2002 | Lok et al. |
| 2002/0162104 A1 | 10/2002 | Raike et al. |
| 2003/0005099 A1 | 1/2003 | Sven et al. |
| 2003/0008703 A1 | 1/2003 | Gauselmann |
| 2003/0018740 A1 | 1/2003 | Sonoda et al. |
| 2003/0031096 A1 | 2/2003 | Nathan et al. |
| 2003/0041093 A1 | 2/2003 | Yamane et al. |
| 2003/0065639 A1 | 4/2003 | Fiennes et al. |
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1 | 6/2003 | Itkis et al. |
| 2003/0108164 A1 | 6/2003 | Laurin et al. |
| 2003/0135424 A1 | 7/2003 | Davis et al. |
| 2003/0208586 A1 | 11/2003 | Mastronardi et al. |
| 2003/0225834 A1 | 12/2003 | Lee et al. |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |

| | | | | | | |
|---|---|---|---|---|---|---|
| 2005/0060405 A1 | 3/2005 | Nathan et al. | | GB | 2170943 | 8/1986 |
| 2005/0073782 A1 | 4/2005 | Nathan | | GB | 2193420 | 2/1988 |
| 2005/0086172 A1 | 4/2005 | Stefik | | GB | A 2193420 | 2/1988 |
| 2005/0125833 A1 | 6/2005 | Nathan et al. | | GB | 2 238680 A | 6/1991 |
| 2005/0267819 A1 | 12/2005 | Kaplan | | GB | 2254469 | 10/1992 |
| 2006/0018208 A1 | 1/2006 | Nathan et al. | | GB | 2259398 | 3/1993 |
| 2006/0035707 A1 | 2/2006 | Nguyen et al. | | GB | A2259398 | 3/1993 |
| 2006/0062094 A1 | 3/2006 | Nathan et al. | | GB | 2262160 A | 6/1993 |
| 2006/0239131 A1 | 10/2006 | Nathan et al. | | GB | 2262170 | 6/1993 |
| 2006/0293773 A1 | 12/2006 | Nathan et al. | | GB | 2380377 | 4/2003 |
| 2007/0121430 A1 | 5/2007 | Nathan | | JP | 57-173207 | 10/1982 |
| 2007/0142022 A1 | 6/2007 | Madonna et al. | | JP | 58-179892 | 10/1983 |
| 2007/0160224 A1 | 7/2007 | Nathan | | JP | 60-253082 | 12/1985 |
| 2007/0204263 A1 | 8/2007 | Nathan et al. | | JP | 61084143 | 4/1986 |
| 2007/0209053 A1 | 9/2007 | Nathan | | JP | 62-192849 | 8/1987 |
| 2007/0247979 A1 | 10/2007 | Brillon et al. | | JP | 62-284496 | 12/1987 |
| 2008/0069545 A1 | 3/2008 | Nathan et al. | | JP | 63-60634 | 3/1988 |
| 2008/0077962 A1 | 3/2008 | Nathan | | JP | 2-153665 | 6/1990 |
| 2008/0086379 A1 | 4/2008 | Dion et al. | | JP | 5122282 | 5/1993 |
| 2008/0096659 A1 | 4/2008 | Kreloff et al. | | JP | 5-74078 | 10/1993 |
| 2008/0137849 A1 | 6/2008 | Nathan | | JP | 07281682 | 10/1995 |
| 2008/0168807 A1 | 7/2008 | Dion et al. | | JP | 08-279235 | 10/1996 |
| 2008/0171594 A1 | 7/2008 | Fedesna et al. | | JP | 8274812 | 10/1996 |
| 2008/0195443 A1 | 8/2008 | Nathan et al. | | JP | 10-098344 | 4/1998 |
| 2008/0239887 A1 | 10/2008 | Tooker et al. | | WO | WO 86 01326 A | 2/1986 |
| 2009/0037969 A1 | 2/2009 | Nathan et al. | | WO | A9007843 | 7/1990 |
| 2009/0070341 A1 | 3/2009 | Mastronardi et al. | | WO | WO 91/08542 | 6/1991 |
| 2009/0138111 A1 | 5/2009 | Mastronardi | | WO | A 9120082 | 12/1991 |
| 2009/0265734 A1 | 10/2009 | Dion et al. | | WO | WO 93/16557 | 8/1993 |
| 2009/0282491 A1 | 11/2009 | Nathan | | WO | A 9318465 | 9/1993 |
| 2010/0042505 A1 | 2/2010 | Straus | | WO | A94 03894 | 2/1994 |
| 2010/0211818 A1 | 8/2010 | Nathan et al. | | WO | WO 94/14273 | 6/1994 |
| 2010/0241259 A1 | 9/2010 | Nathan | | WO | WO 94/15306 | 7/1994 |
| 2010/0269066 A1 | 10/2010 | Nathan | | WO | WO 94 15416 A | 7/1994 |
| | | | | WO | WO 95 03609 A | 2/1995 |
| FOREIGN PATENT DOCUMENTS | | | | WO | WO 95/29537 | 11/1995 |
| DE | 3723737 A1 | 1/1988 | | WO | WO 96 12255 | 4/1996 |
| DE | 38 20 835 | 1/1989 | | WO | WO 96 12256 | 4/1996 |
| DE | 3820835 A1 | 1/1989 | | WO | WO 96/12257 | 4/1996 |
| DE | A3820835 | 1/1989 | | WO | WO 96 12258 A | 4/1996 |
| DE | 38 15071 | 11/1989 | | WO | WO 98/07940 | 2/1998 |
| DE | 4 244 198 | 6/1994 | | WO | WO 98 45835 | 10/1998 |
| DE | 19610739 | 9/1997 | | WO | WO 01/00290 | 1/2001 |
| DE | 19904007 | 8/2000 | | WO | WO 01/08148 | 2/2001 |
| EP | 0082077 | 6/1983 | | WO | WO 02/095752 | 11/2002 |
| EP | A9007843 | 6/1983 | | WO | WO 2006/014739 | 2/2006 |
| EP | 0140593 A2 | 5/1985 | | | | |
| EP | 0256921 | 2/1988 | | | | |
| EP | 0283304 | 9/1988 | | | | |
| EP | A0283350 | 9/1988 | | | | |
| EP | 0 309 298 | 3/1989 | | | | |
| EP | A0313359 | 4/1989 | | | | |
| EP | 0340787 | 11/1989 | | | | |
| EP | 0363186 | 4/1990 | | | | |
| EP | 0 425 168 A | 5/1991 | | | | |
| EP | 0464562 A2 | 1/1992 | | | | |
| EP | 0480558 | 4/1992 | | | | |
| EP | 0498130 | 8/1992 | | | | |
| EP | 0498130 A2 | 8/1992 | | | | |
| EP | 0507110 | 10/1992 | | | | |
| EP | 0 529 834 | 3/1993 | | | | |
| EP | 0538319 B1 | 4/1993 | | | | |
| EP | A0631283 | 12/1994 | | | | |
| EP | 0632371 | 1/1995 | | | | |
| EP | 0711076 | 5/1996 | | | | |
| EP | 0786122 B1 | 7/1997 | | | | |
| EP | 0817103 | 1/1998 | | | | |
| EP | 0841616 A2 | 5/1998 | | | | |
| EP | 0919964 | 6/1999 | | | | |
| EP | 0959570 A1 | 11/1999 | | | | |
| EP | 0 974 896 A1 | 1/2000 | | | | |
| EP | 0974941 | 1/2000 | | | | |
| EP | 0982695 | 3/2000 | | | | |
| EP | 1001391 | 5/2000 | | | | |
| EP | 1408427 | 4/2004 | | | | |
| FR | A2602352 | 2/1988 | | | | |
| FR | 2808906 | 11/2001 | | | | |
| GB | A 2122799 | 1/1984 | | | | |
| GB | 2166328 A | 4/1986 | | | | |

OTHER PUBLICATIONS

"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.

Derfler et al., "How Networks Work", Millennium Ed., Que Corporation, Jan. 2000.

European Search Report from EP 1 993 079.

European Search Report issued for European Application No. 08000845.1-1238/1962251, dated Apr. 3, 2009.

Gralla, "How the Internet Works", Millennium Ed., Que Corporation, Aug. 1999.

Hicks et al., "Dynamic software updating", ACM PLDI, pp. 13-23, 2001.

iTOUCH 27 New Games brochure, JVL Corporation, 2005, 2 pages.

iTouch 8 Plus brochure, JVL Corporation, 2005, 2 pages.

Kozierok, The PC Guide, Site Version 2.2.0, http://www.pcguide.com, Apr. 17, 2001.

Liang et al., "Dynamic class loading in the Java virtual machine", ACM OOPSLA, pp. 36-44, 1998.

Look and iTouch brochure, JVL Corporation, 2004, 2 pages.

Megatouch Champ brochure, Merit Industries, Inc., 2005, 2 pages.

Melnik et al., "A mediation infrastructure for digital library services", ACM DL, pp. 123-132, 2000.

Mod Box Internet brochure, Merit Entertainment, 2006, 2 pages.

Newsome et al., "Proxy compilation of dynamically loaded java classes with MoJo", ACM LCTES, pp. 204-212, 2002.

Schneier, "Applied Cryptography", Second Edition, John Wiley & Sons, Inc. New York, 1996.

Vortex Brochure, JVL Corporation, 2005, 2 pages.

Waingrow, "Unix Hints & Hacks", Que Corporation, Indianapolis, IN, 1999.

White, "How Computers Work", Millennium Ed., Que Corporation, Indianapolis, IN, Sep. 1999 (Sep. 22, 1999).

Patent Abstract of Japan vol. 95, No. 010 & JP 07 281682 A (Naguo Yuasa), 27 Oct. 1 JP 07 281682, figure 1-6 abrége.

Bonczck, Robert H. et al, "The DSS Development System", 1983 National Computer Conference, Anaheim, California, May 16-19, 1983, pp. 441-455.

IBM Technical Disclosure Bulletin, vol. 30, No. 5, Oct. 1987, "Method for Automated Assembly of Software Versions", pp. 353-355.

"Robotic Wafer Handling System for Class 10 Environments" IBM Technical Disclosure Bulletin, vol. 32, No. 9A, Feb. 1990, pp. 141-143.

"High-speed Opens and Shorts Substrate Tester", IBM Technical Disclosure Bulletin, vol. 33, No. 12, May 1991, pp. 251-259.

"Darts Revolution Again", Replay Magazine, Mar. 1991, pp. 146-148.

Galen A. Grimes, "Chapter 18, Taking Advantage or Web-based Audio."

Petri Koskelainem "Report on Streamworks™".

W. Richard Stevens, "TCP/IP Illustrated: vol. 1, the Protocols".

Nowell Outlaw "Virtual Servers Offer Performance benefits for Networks Imaging".

Fachbuch "Unterhaltungselektronic von A-Z" gfu 1, VDE-Verlag GmbH, pp. 12-13, 1983-1984.

* cited by examiner

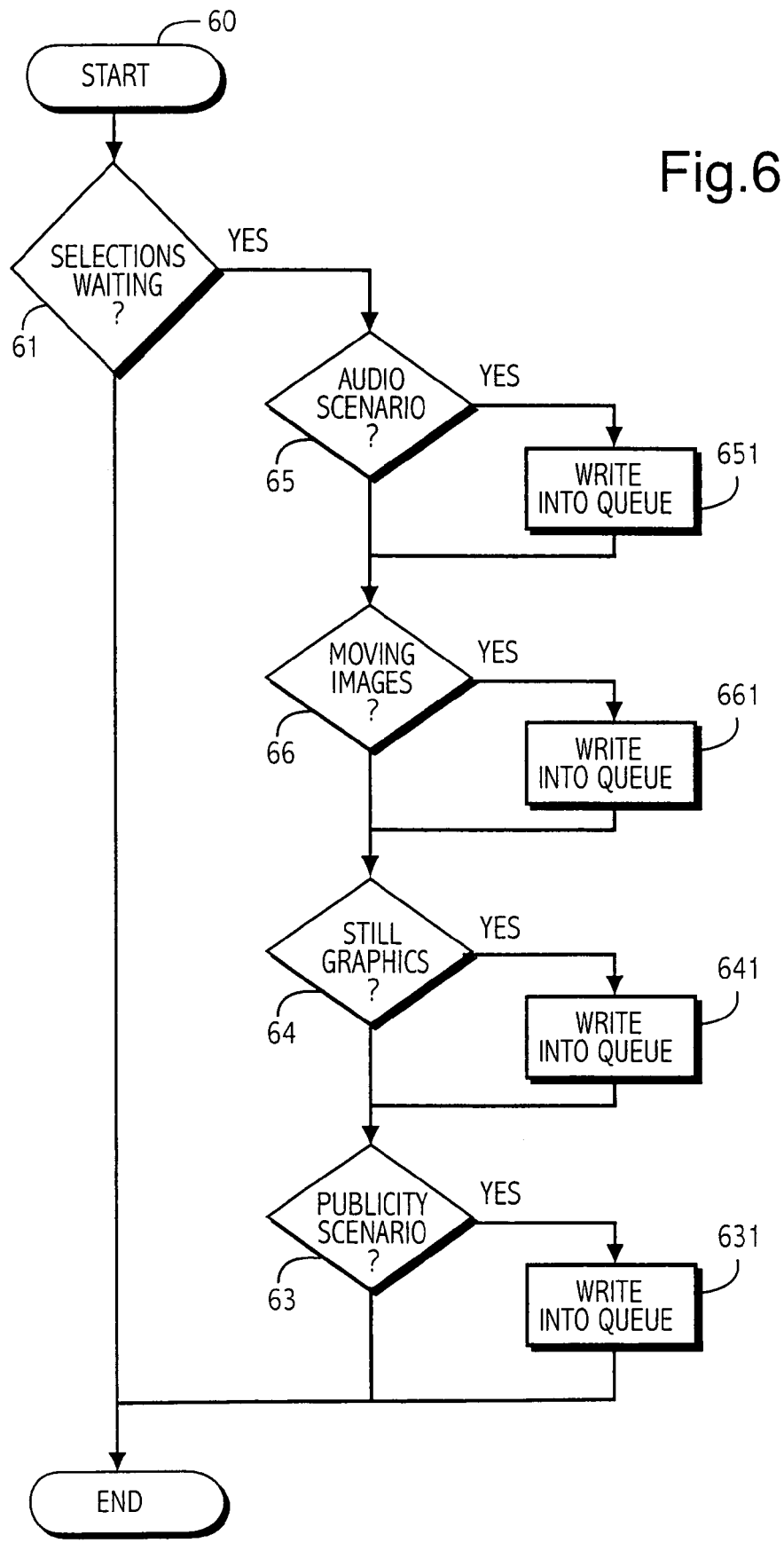

HOME DIGITAL AUDIOVISUAL INFORMATION RECORDING AND PLAYBACK SYSTEM

CROSS-REFERENCE TO RELATED APPLICATIONS

This application is a continuation of application Ser. No. 09/642,928, filed Aug. 22, 2000, now U.S. Pat. No. 7,424,731, which is a continuation of U.S. Ser. No. 08/817,437, filed Jun. 12, 1997, now U.S. Pat. No. 6,182,126 which is the U.S. national phase of International Application No. PCT/FR95/01336, filed 12 Oct. 1995, which claims priority to PCT/FR94/01185, filed 12 Oct. 1994, the entire contents of which are hereby incorporated by reference in this application.

This application is related to our copending commonly assigned applications:

| | |
|---|---|
| USSN 08/817,690 | (Corres. to PCT/FR94/01185 filed Oct. 12, 1994); |
| USSN 08/817,689 | (Corres. to PCT/FR95/01333 filed Oct. 13, 1995) |
| USSN 08/817,528 | (Corres. to PCT/FR95/01334 filed Oct. 12, 1995) |
| USSN 08/817,968 | (Corres. to PCT/FR95/01335 filed Oct. 12, 1995) |
| USSN 08/817,426 | (Corres. to PCT/FR95/01337 filed Oct. 12, 1995) |
| USSN 08/817,438 | (Corres. to PCT/FR95/01338 filed Oct. 12, 1995) |

BACKGROUND AND SUMMARY OF THE INVENTION

This is a continuation of application Ser. No. 08/817,437, filed Jun. 12, 1997, the entire content of which is hereby incorporated by reference in this application.

The invention relates to a home digital audiovisual information recording and reproduction apparatus.

Audiovisual reproduction systems found generally in cafes or pubs and called jukeboxes are known. These devices are generally bulky including large storage capacities unsuited for home use. The object of this invention is to eliminate these defects of the prior art by proposing a device which allows a home user to acquire digital audiovisual data selections using his TV and to reproduce them using the TV screen for the visual part and the components of his stereo system for the audio part.

The first object of the invention is to propose an apparatus which allows selection and downloading of digital data, and reproduction of these digital data for domestic apparatus or use of the device for karaoke.

This first object is achieved with a home digital information audiovisual recording and playback apparatus developed around a microprocessor device linked via a digital interface to a display and by another interface to audio reproduction structure. The apparatus includes a telecommunications interface for downloading the digital data containing the audio selection or the video selection. The apparatus includes control structure that allows control of a display device and selection via a menu of one operating mode from among three in which the device either plays back data stored in its mass storage or allows recording of a new item of digitized data in its mass storage or mixes with the digitized data delivered by the mass storage of a piece of analog data delivered by a microphone.

A second object of the invention is to devise a modular apparatus which consequently allows continued development of the device to support recording of selections on a portable medium.

This object is achieved with a supplementary recording module connected by a specific interface to the primary apparatus, and a recording menu can be selected using the buttons of the control structure of the device of the primary apparatus.

According to another feature, the recording module allows production of portable recording media to be played on another digital audiovisual information playback unit.

Another object of the invention is to devise a modular device which allows the user to develop a design allowing storage of a plurality of audio or video or audiovisual information selections.

This object is achieved by a second mass storage module allowing the recording of a plurality of digitized audiovisual data.

Another object is to devise an apparatus which allows selection of audio or video or audiovisual digital data to be downloaded while enabling this information to be reproduced on the audio and video systems which he already owns.

This object is achieved by providing the home digital audiovisual information recording and reproduction apparatus with a central unit, a telecommunications interface linked to a connector and managed by the central unit, an electronic input control circuit managing a plurality of control buttons and a sensor of infrared or audio emission originating from a remote control box, an emitter of the same waves, an electronic extension controller circuit connected to a connector, an electronic audio controller circuit linked to audio output connectors for stereo systems and a microphone input connector, and an electronic video controller circuit linked to connectors of a video peripheral apparatus. The set of electronic circuits managed by the central processor utilizes a multitask operating system and a computer operating program stored in a battery backed-up static RAM, which is part of the electronic circuit of the central unit. The static battery backed-up RAM is used as storage for at least one selection of audiovisual digital data and a graphics control circuit, which controls a liquid crystal display device.

The final object is to devise a method of downloading which ensures effective payment and non-selection of audiovisual data by individuals not skilled in the domestic system.

This object is achieved by proving an operating mode of link selection control which allows downloading with a server once the user has given for example his credit card number and confirmed the set of his selection or selections by supplying a personal identification number. This object can also be achieved by any other method of payment such as: prepaid chip card or automatic billing on the subscriber phone bill.

BRIEF DESCRIPTION OF THE DRAWINGS

Other features and advantages of this invention will be illustrated by the following description with reference to the attached drawings in which:

FIG. 6 shows a flowchart of the queuing of the selections;

DETAILED DESCRIPTION OF PREFERRED EMBODIMENTS

Figure 1:
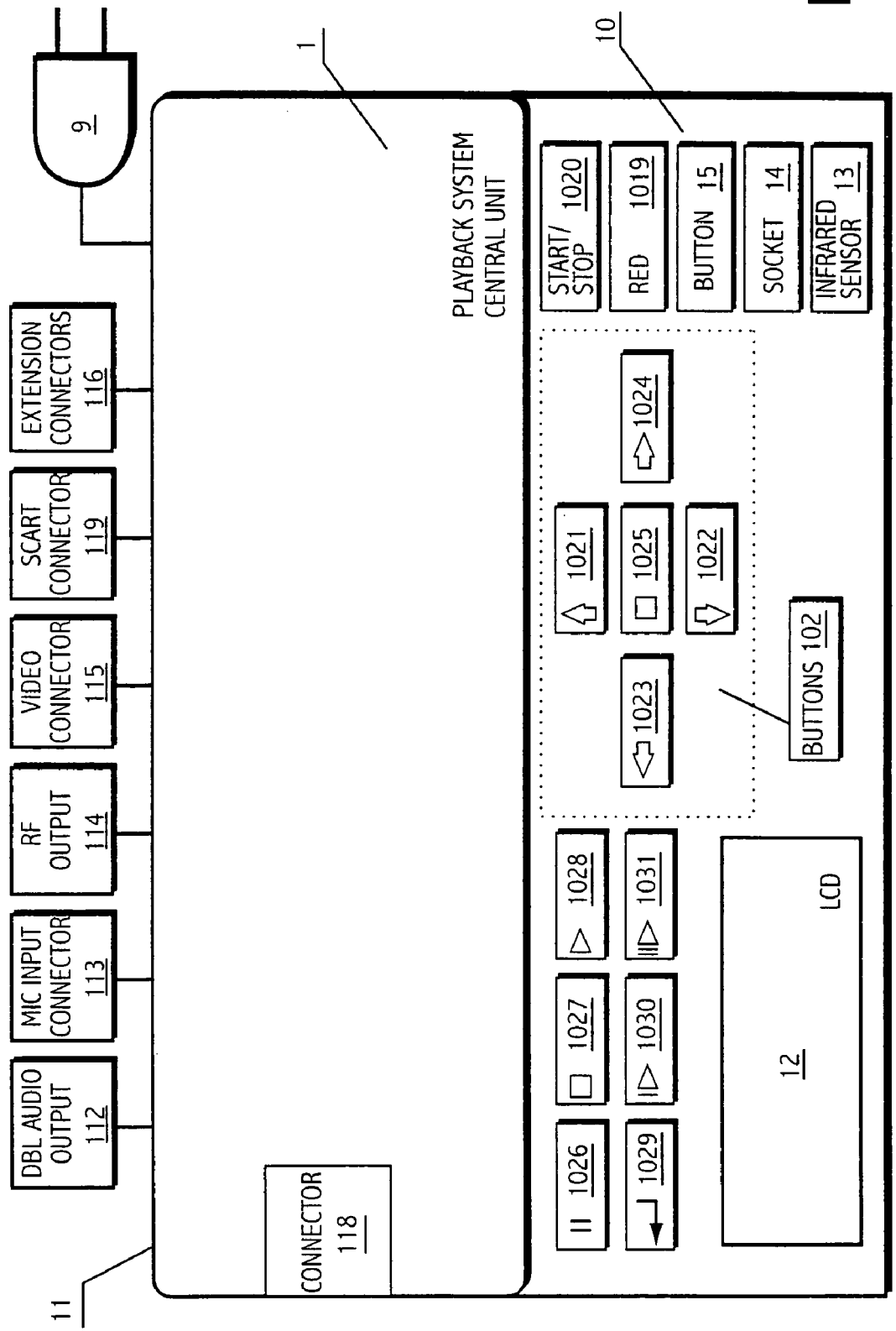
FIG. 1 shows a schematic of the front and back of the apparatus according to the invention.

Preferably, but in a nonrestrictive manner, the audiovisual reproduction system uses the aforementioned listed components.

The primary module is a high performance, PC microprocessor-compatible electronic device, with for example an Intel 80486 DX/2 type system which has storage means and the following characteristics:

compatibility with the local Vesa bus,
processor cache memory: 256 kB,
RAM of 32 MB or more, battery backed-up
high performance parallel and serial ports,
graphics adapter with video baseband, radio frequency (RF) band output and SCART connector,
type SCSI/2 bus type controller as the extension controller Any other central unit with equivalent or superior performance can be used in the invention.

The central unit (106) controls and manages an audio control circuit (110), a telecommunications control circuit (104), an input control circuit (105), and a display control circuit (111).

Input controller (105) interfaces with a remote control (101) and control buttons (102) located on the front of the apparatus. Telecommunications controller (104) interfaces with various telecommunications hardware (103) to allow the system to use several media for communicating with the outside. Audio controller (110) is a D/A converter with multiple inputs/outputs to which the customer microphone and amplifier are connected. The video controller delivers the baseband and RF band video signals of the screens to be displayed. An extension controller (107) makes it possible to link the other modules (108, 109) to the primary module.

A communications link between the primary module and the distribution center is also required. This link can be either a modem for a classical telephone line or a specialized line with a speed of at least 28.8 kbps or a link by parabolic antenna and satellite, or an ISDN telecommunications link or by coaxial cable or by MMDS-receiving antenna.

For radio wave type links, requests are made by classical telephone line.

Audio reproduction of the musical selections is done by a digital/analog converter circuit provided to support a large number of input sources while providing an output with an audio quality similar to a compact disk. The microprocessor multimedia audio adapter Sound Blaster SBP32AWE from Creative Labs Inc. is one example in which two buffers (1101, 1102) are added.

Likewise, the control circuit of the display likewise includes two buffers (1111, 1112).

Operation and management of the system are performed using either control buttons (102) of the apparatus or remote control (101). An infrared remote control linked to an infrared sensor with serial adapter can be used in the system.

The diagram from FIG. 1 shows that the primary module has a RIAA stereo audio output, one microphone input for karaoke, a baseband and RF video output, and a connector for connecting it to the other expansion modules and a SCART connector.

Data are displayed on the TV set of the owner either by the RF connector or the baseband connector or the SCART connectors.

A battery system maintains the system memory when it is off. These long life batteries are recharged when electricity is supplied to the apparatus.

A thermally controlled and ventilated power supply powers the system. This power supply can be protected against surges and harmonics.

Figure 2:
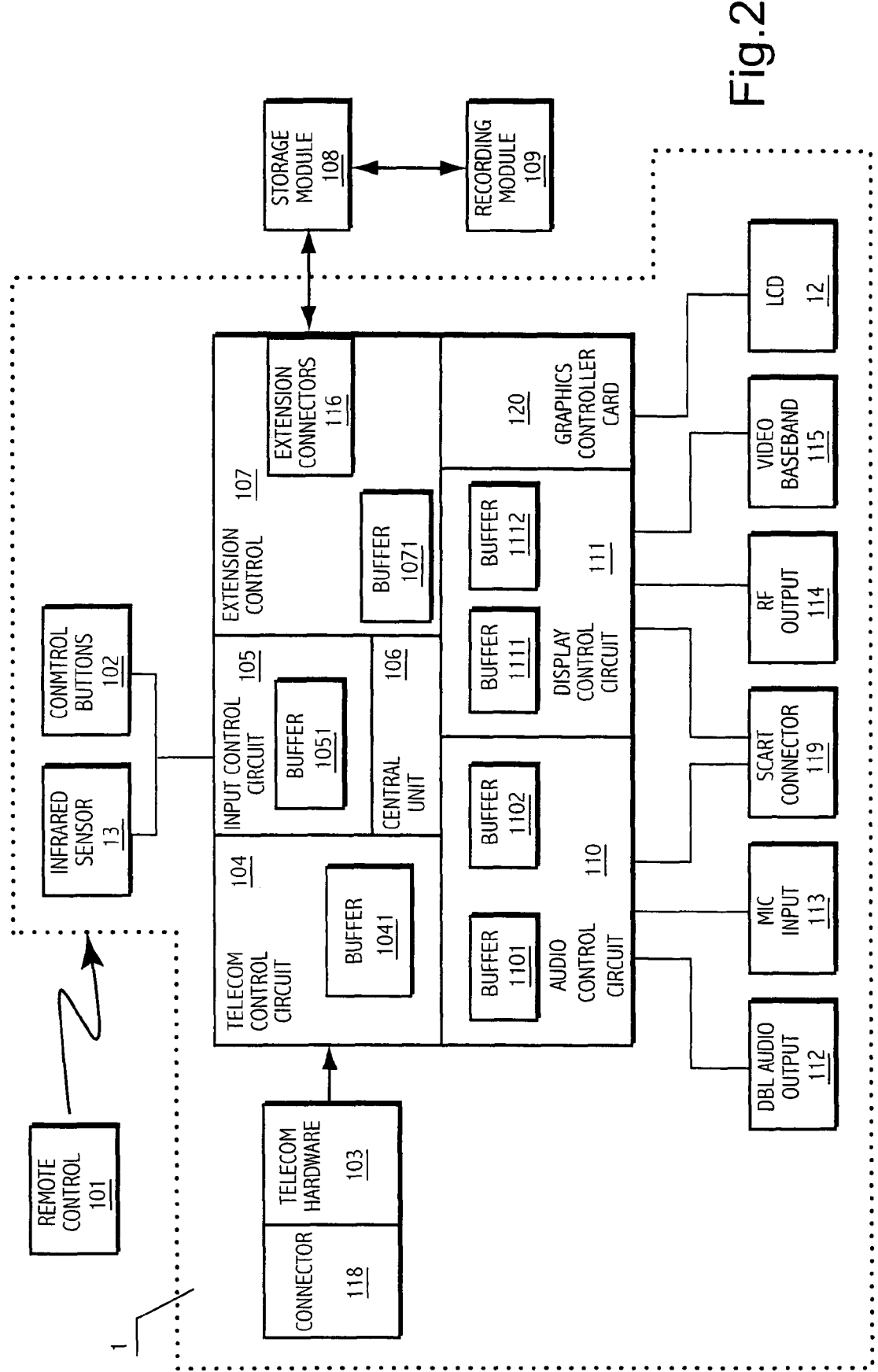
FIG. 2 shows a schematic of the general architecture of the electronic circuit comprising the apparatus.

The electronic device is placed in a box which includes on one of its sides (11), for example, the back, an electric power cord with line socket (9), a double audio output (112) comprising RCA jack type sockets, a microphone input connector (113), a video connector (115) for the video baseband of the NTSC PAL or SECAM type and an RF radio frequency type output (114) and a SCART European connector (119). As FIG. 2 shows, audio output (112) and microphone input (113) are linked to audio controller card (110), RF video/audio output (114) is linked to video controller card (111) and to audio controller card (110) via an RF modulator with M-B/G or L standards, for example, SCART connector (119) is linked to video controller card (111) and to audio controller card (110), video baseband (115) is linked to video controller card (111), extension connectors (116) are linked to extension controller card (107), one connector (118) of the telephone line type is linked to telecommunications circuit card (103) which is linked to telecommunications controller (104). Finally, the box includes on its front (10) a set of buttons (102) containing arrow (1021) which allows a cursor to move up, arrow (1022) which allows the cursor to move down, arrow (1023) which allows the cursor to move to the left, arrow (1024) which allows the cursor to move to the right, and finally central button (1025) allowing activation or validation and corresponding to a down event equivalent to a mouse, the arrows allowing movement of a cursor and corresponding to a drag event. Release of button (1025) corresponds to a button release event, i.e., up for a mouse. Front (10) includes a red button (1019) which allows the "purchase'" function described below. The front also includes a liquid crystal screen (12) linked to a graphics controller card (120) to allow minimum display in the case in which the user does not connect a TV screen at the video or RF output. The side also contains a button (15) allowing adjustment of the volume of headphones connected to a socket (14) for a hifi headset. Finally, device start and stop button (1020) is located on the front (10). A zone containing infrared sensor (13) itself connected to input controller card (105) allows reception of infrared signals from remote control (101). It is apparent that the type of sensor can be modified according to the type of remote control used without departing from the framework of the invention. Finally, the front may include a set of buttons which allows control of functions ordinarily used for CD playback, i.e., "pause" function (1026), "stop" function (1027), "read" function (1028), "return" function (1029), "advance" function (1030), "following" function (1031). These functions are linked to storage (108) and recording (109) modules when they are connected by extension connector (116) to extension card (107) as shown in FIG. 2.

Besides these components, a microphone connected to audio controller (110) allows use of this equipment as a karaoke machine.

Two buffers (1101, 1102) are connected to audio controller circuit (110) to allow storage of one item of information corresponding to a quarter of a second of sound each in alternation. Likewise, two buffers (1111, 1112) are linked to video controller circuit (111) which are each able to store a tenth of a second of video alternately. Finally, a respective buffer (1041, 1051, 1071) is connected to each of the circuits of the communication controller (104), input interface (105) and extension (107).

The system operating software has been developed around a library of tools and services largely oriented to the audio-visual domain in a multimedia environment. This library advantageously includes an efficient multitask operating system which efficiently authorizes simultaneous execution of multiple fragments of code. This operating software thus allows concurrent execution, in an orderly manner and avoiding any conflict, of operations performed on the display, audio reproduction structure as well as management of the telecommunications lines via the distribution network. In addition, the software has high flexibility.

The library contains, as will be shown below, a programming interface for buttons (102) or remote control (101) connected to each graphics module which will be described below, and linking to the functions of the connected graphics module functions of reaction to activation by one or more external events. External events originate from the user and are processed by the interface to be able to be interpreted by the operating system as the equivalent of a mouse event.

Digitized and compressed audiovisual data are stored in the nonvolatile storage of CPU (106) such as a static RAM.

Each selection is available according to digitized formats: with hi-fi quality or CD quality.

It must be noted that while all these modules described separately seem to be used sequentially, in reality the specific tasks of these modules are executed simultaneously in an environment using the multitask operating system.

The first module, labeled SSM, is the system startup module. This module does only one thing, consequently it is loaded automatically when the system is powered up. It then directly enters the "in service" mode of the module labeled RRM.

The RMM module is the module of the "in service" mode. In this mode the system is ready to handle any request which can be triggered by various predefined events such as:
 the user who touches one of control keys (102) on front (10) or remote control (101). In this case the system transfers control of its foreground session to the CBSM module of the customer browsing and selection mode.

The system remains in this "in service mode" until one of the above described events occurs.

Figure 8:
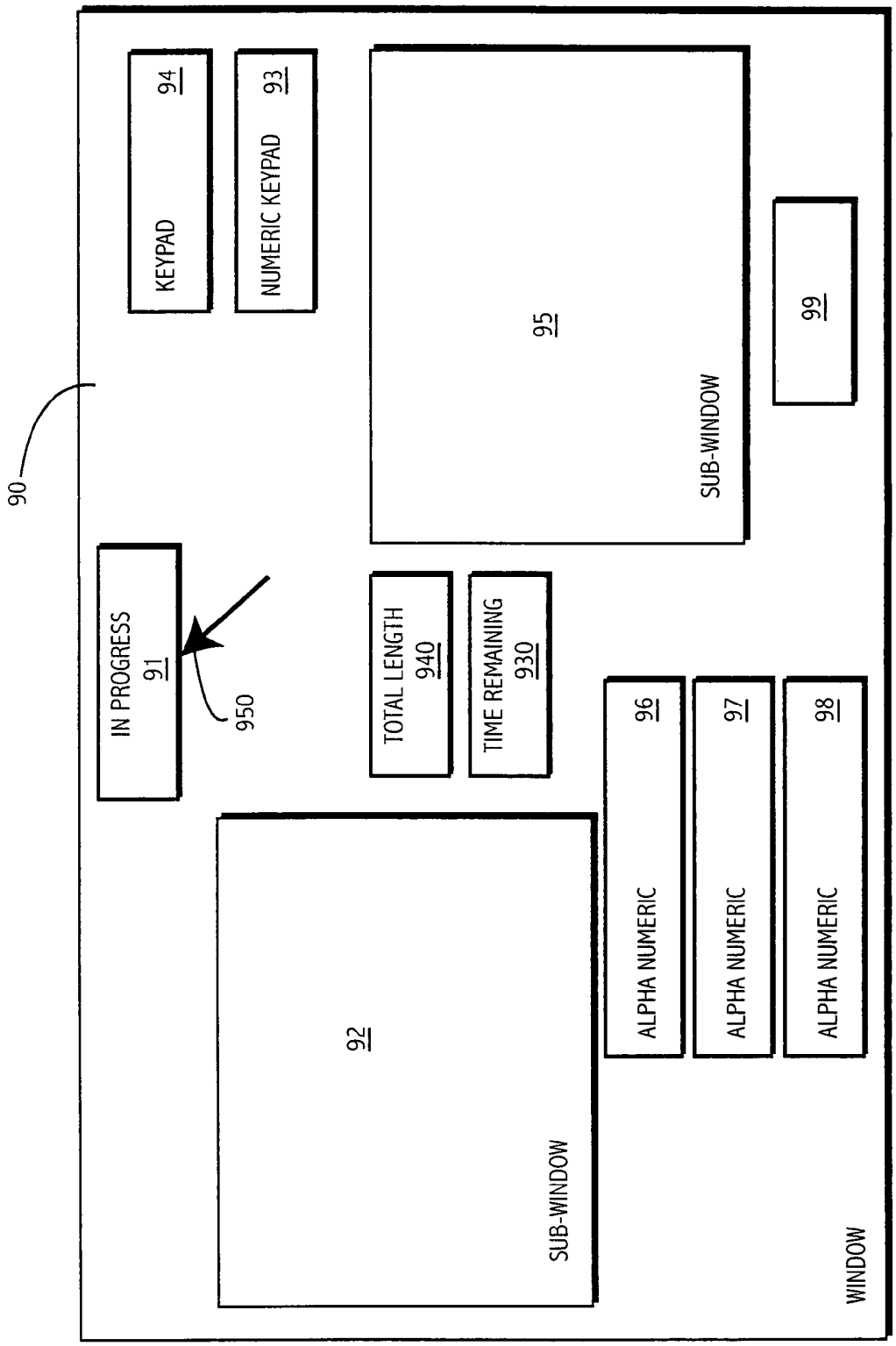
FIG. 8 shows an example of graphics display by the graphics module of the in service mode module.

Thus, the RMM module of the in service mode includes a module allowing graphics display corresponding for example to that of FIG. 8. The screen of this graphics module allows display of a window (90) which contains for example the display in zone (91) of the note "in progress" of execution. A second smaller window (92) included in first window (90) allows graphics display of the disk jacket during performance. In numeric keypad (93) the total time corresponding to pieces to be played which are stored in the queue is indicated. The number of songs in the queue is indicated in another digital keypad (94). A third smaller window (95) included in first window (90) displays a moving image such as a video clip, synthesized images or moving text if it is a karaoke title stored in the video files. In alphanumeric keypad (96) is the album title and in second alphanumeric keypad (97) the album name. In third alphanumeric keypad (98) the name of the artist or group is mentioned. This information originates from database (16) based on the title identification number and information stored in the database according to the access process explained below.

This reproduction screen displays the title which is performed, its total length (940), remaining time (930) and the disk jacket from which it originates. Use of the "action" function from the remote control or button (1025), cursor (950) being anywhere on the screen, allows the owner to pass to the screen of the selection shown in FIG. 10.

In the case in which the jukebox is not playing a song and when the songs of the queue have been exhausted, one of two windows (92, 95) will be able to be used to display promotional events or synthesized image animations.

A module specific to the remote control allows functions which command the system to accept an input requested by an infrared remote control device.

Figure 9:
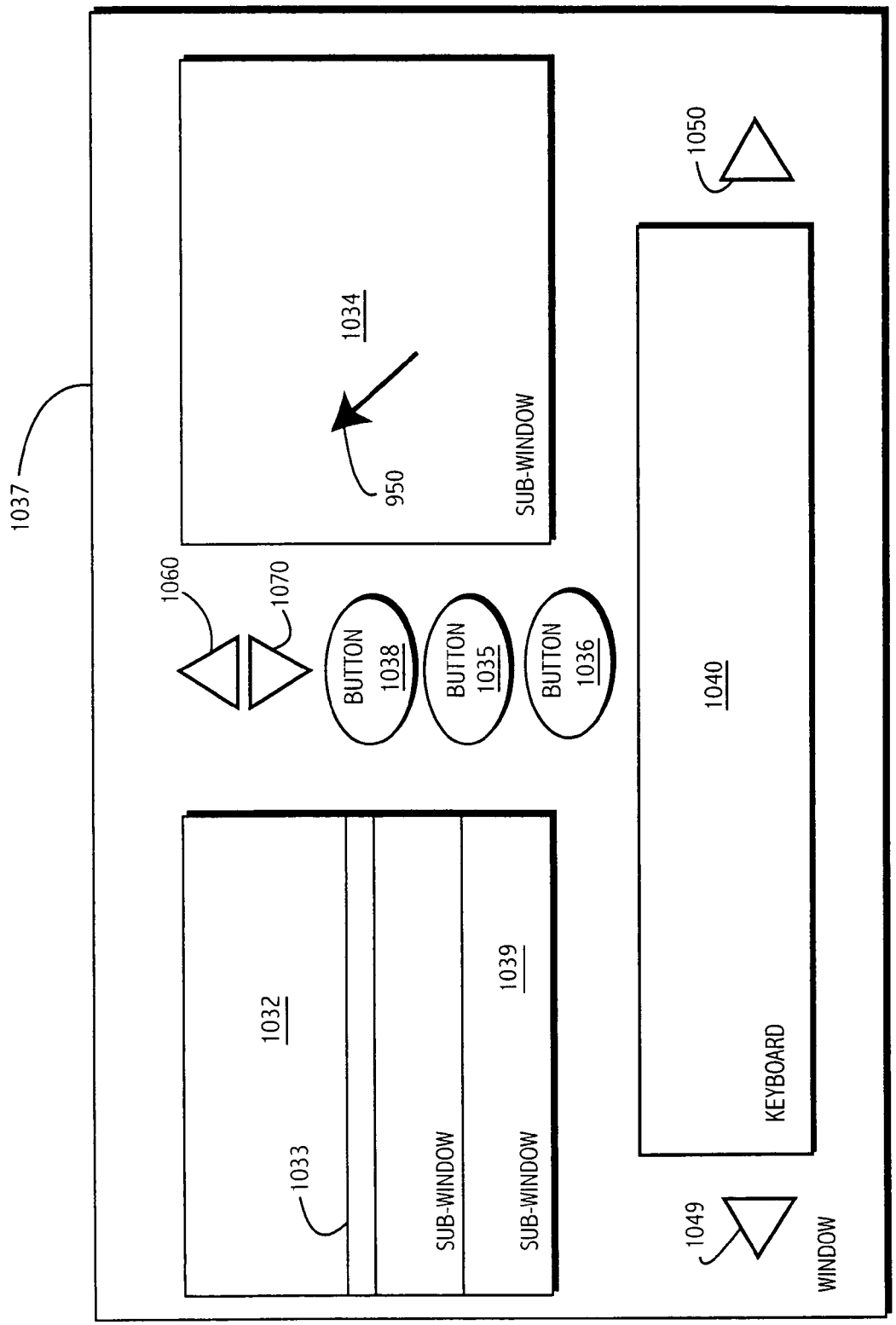
FIG. 9 shows an example of graphics display by the graphics module of the new selection acquisition mode module.

This remote control device can trigger display of the graphics screen located in FIG. 9 when the "purchase" key equivalent to (1019) of the remote control is pressed.

This remote control has keys with functions equivalent to those described above in FIG. 1, i.e.: (1026) to (1031), (1021) to (1025), (1019) to (1020).

The display of FIG. 9 allows the user to access the new selections acquisition mode in connection with the NSAM module.

This module shown in FIG. 9 contains a graphics module which allows display of window (1037). This window incorporates three subwindows (1032, 1033, 1034), the first (1032) in the form of a pull-down list makes it possible to have the selection list scrolled by pressing key (1025) by positioning a cursor (950) on pull-down arrow buttons (1060, 1070).

This selection list can only be displayed either after having displayed the category selection screen (FIG. 11), after having pressed button (1036) beforehand, highlighting title (1033) by positioning the cursor on the desired title and pressing key (1025), or after having introduced in subwindow (1039) at least one character by keyboard (1040) using the cursor and key (1025).

Generally the zones of graphics buttons are actuated by positioning cursor (95) using arrows (1021 to 1024) and pressing button (1025) or via the equivalent function keys of the remote control.

Window (1034) allows display:
 when selection order button (1038) is activated, the note "type in your PIN", in fact, purchase can only be possible if the personal identification number is accepted by central unit (1) of the playback system.

The user types his "PIN" on keyboard (1040); if the PIN is correct, window (1034) displays for example the note "credit card number" or if the purchase is billed on the telephone bill, window (1034) displays for example "purchase underway".

Figure 7:
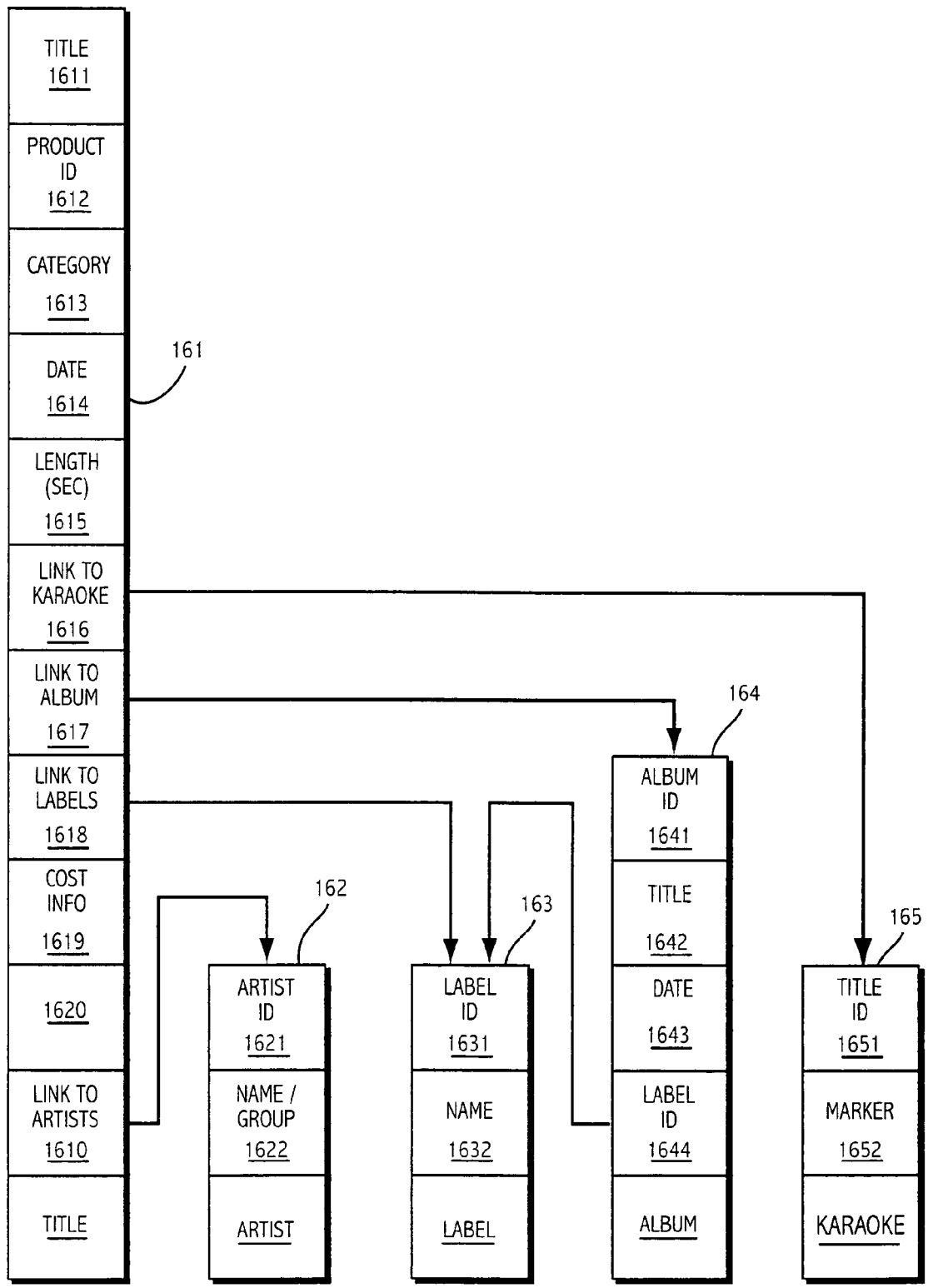
FIG. 7 shows an organizational diagram of the database.

A catalog of musical titles is kept in the primary module. This catalog can be updated at the request of the owner or automatically during purchase. The cost of each entry is displayed as well as the bill total by using information (1619) from the database (FIG. 7).

During communication it is possible for the server center to use it in order to upgrade the system operating software.
 when the "detail" button (1035) is pushed, various information linked to the highlighted title appears in window (1034), such as the price of the selected title, its length, the album name, the name of the artist or any other information characteristic of the selected title.

Button (1038) allows ordering of the selection which is then downloaded according to the above described mode. Button (1035) allows display of the details on the selection. Third button (1036) allows selection of the category of music or the selection to be ordered. The user pressing this third button (1036) displays the screen shown in FIG. 11 which will be described below. Finally, the screen of FIG. 9 likewise contains an alphanumeric keypad representing keyboard (1040) which allows the user, by typing either the name of the album, artist or title written in subwindow (1039), to display in window (1032) a list of titles more or less restricted depending on the criterion used and the control keys allowing display of the preceding screen by arrow (1049) and the following screen by arrow (1050).

Figure 10:
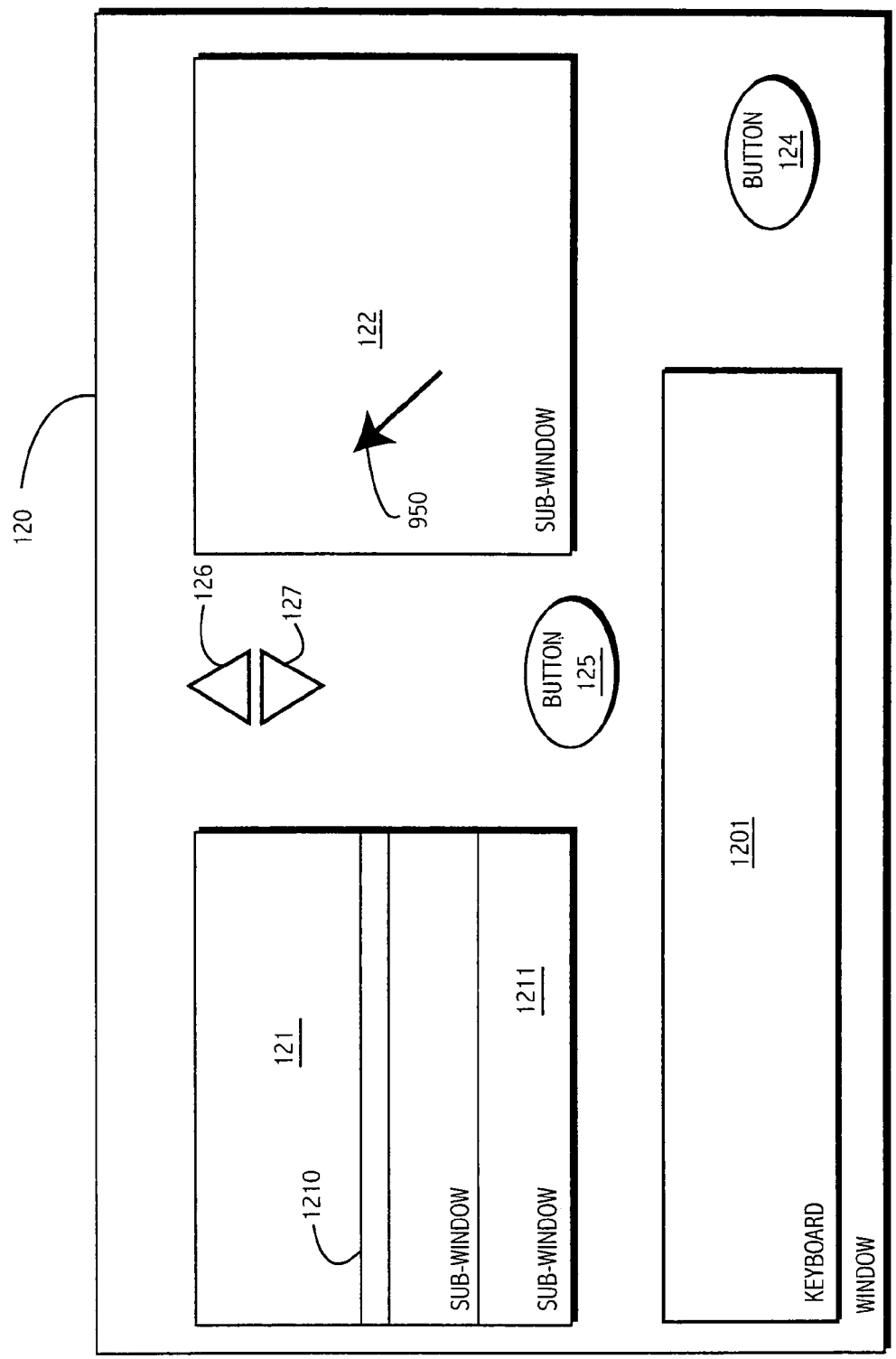
FIG. 10 shows an example of graphics display by the graphics module of the browsing and selection mode module.

As stated above, the selection graphics screen shown in FIG. 10 is displayed by button (1025) from any zone of the playback graphics screen (FIG. 8). One example of the graphics module of the user browsing and selection mode module is shown in FIG. 10 in which window (120) includes three subwindows (121, 1211, 122), the first (121) being a pull-down subwindow. Pull-down of first window (121) is controlled by upper (126) and lower (127) pull-down arrows. As described above for the NSAM module, a title list can only appear in window (121) if a selection criterion has been introduced using keyboard (1201) connected to window (1211) of FIG. 10 or using window (110) triggered by category button (125) connected either to keyboard (1110) which can write an alphanumeric text in keypads (1120, 1121, 1130, 1140), or to zones (1151) to (1156) of window (110) shown in FIG. 11. Window (121) allows display of titles of selections in alphabetic order by song name. Window (122) allows display of the visual display unit corresponding to the song jacket. Button (125) allows selection of the song category and passage to the display of the following window shown in FIG. 11. Button (124) allows validation of the selection or selections for initiating their introduction into the queue or their immediate and successive performance if the queue is empty. Window (120) is completed by alphanumeric keyboard (1201) which makes it possible to directly enter the name of another singer or song title. Pressing category button (125) of FIG. 10 equivalent to (1036) of FIG. 9 calls up a subroutine of the graphics module which triggers display of window (110) of FIG. 11 in which an alphanumeric keypad makes it possible to introduce, using alphanumeric keyboard (1110), the album name in zone (1120), a second alphanumeric keypad (1121) makes it possible to introduce the name of the artist in zone (1121), and third and fourth alphanumeric keypads (1130, 1140) allow introduction of a year or period and finally a line of buttons (1151 to 1156) allows selection respectively solely of "rock and roll", "dance", "country", "rap", "jazz" music albums or music for karaoke. Finally, window (110) contains button (1160) for cancellation in case of error, button (1170) for validation of the choice of selection, allowing return to window (120). Within subwindow (121) there then appears a list of one to several titles depending on a selection criterion, the user selects using cursor (950) the title which he wishes to hear, it is highlighted (1210) and simultaneously subwindow (122) displays the visual display unit corresponding to the album jacket containing the selected title. The user need simply press button (124) which causes changing of the graphics screen to display window (90) (FIG. 8) in which he will see appear in subwindow (92) the title jacket which he has selected and he will immediately hear it if the queue was at zero, in the opposite case he will see appear the title jacket will appear during performance and in keypad (94) the number of titles in the queue increased by the number of the titles which he has selected.

Figure 11:
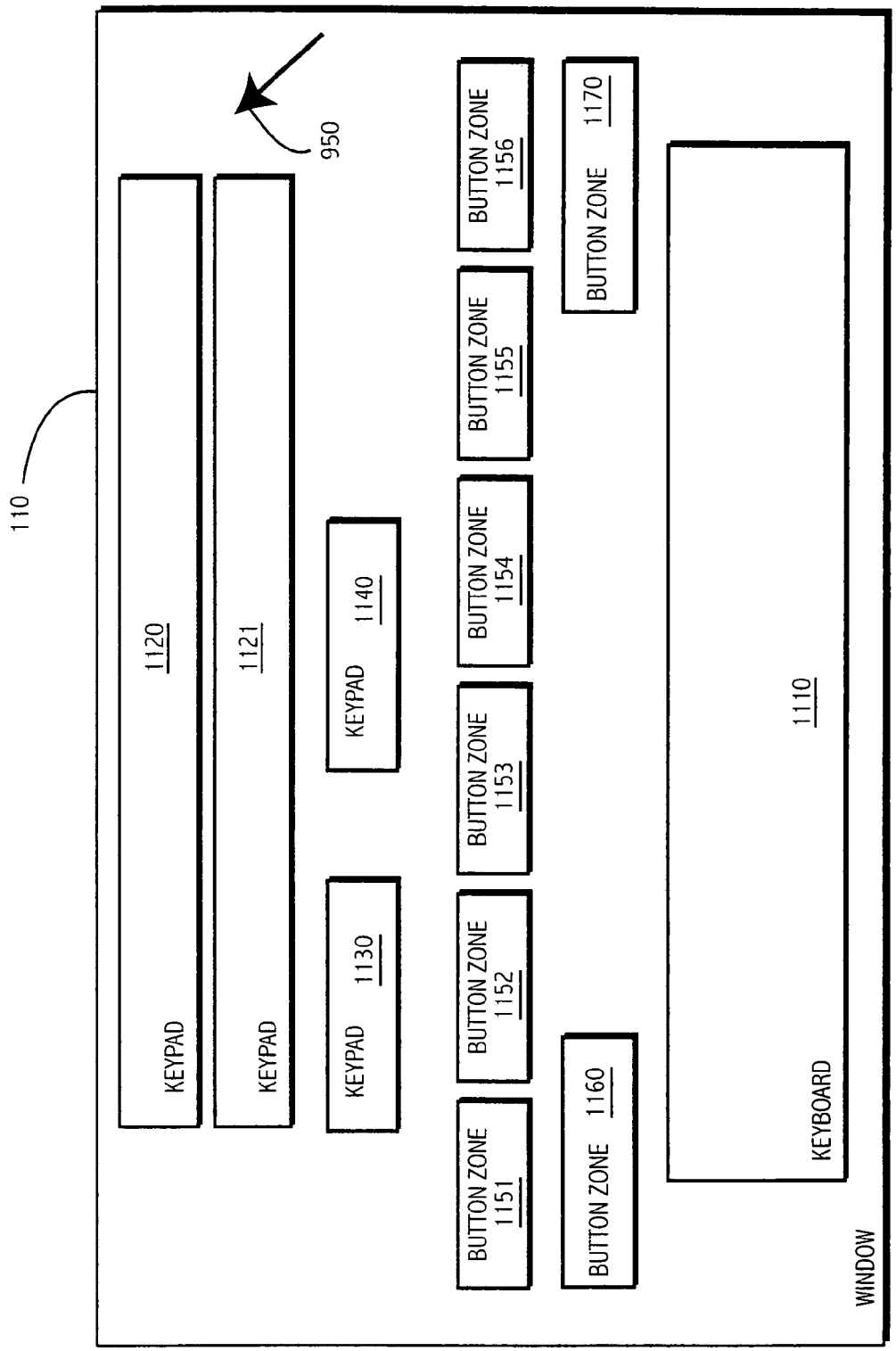
FIG. 11 shows an example of graphics display by the graphics module of the category selection mode module.

When the user presses button (1156) "karaoke", in the graphics screen of the category illustrated in FIG. 11, then validates his choice by pressing graphics button (1170), the selection screen of FIG. 10 appears with a list of karaoke titles within the subwindow (121). By means of highlighting (1210) he chooses the title which he wishes to execute by then pressing button (124) which on the one hand causes display of reproduction screen (90) in FIG. 8 and on the other hand triggers reading of the pertinent title files which contain all the information necessary for operation in the karaoke mode described above.

The TSM module is the telecommunications services mode module between the central server and the audiovisual reproduction system. This module allows management of all management services available on the distribution network. All the tasks specific to telecommunications are managed like the background tasks of the system. These tasks always use only the processing time remaining once the system has completed all its foreground tasks. Thus, when the system is busy with one of its higher priority tasks, the telecommunications tasks automatically will try to reduce the limitations on system resources and recover all the microprocessor processing time left available.

A SPMM module allows the system to manage the musical song or video selections in the queue for their playback in the order of selection.

The multitask operating system comprises the essential component for allowing simultaneous execution of multiple code fragments and for managing priorities between the various tasks which arise.

Figure 3:
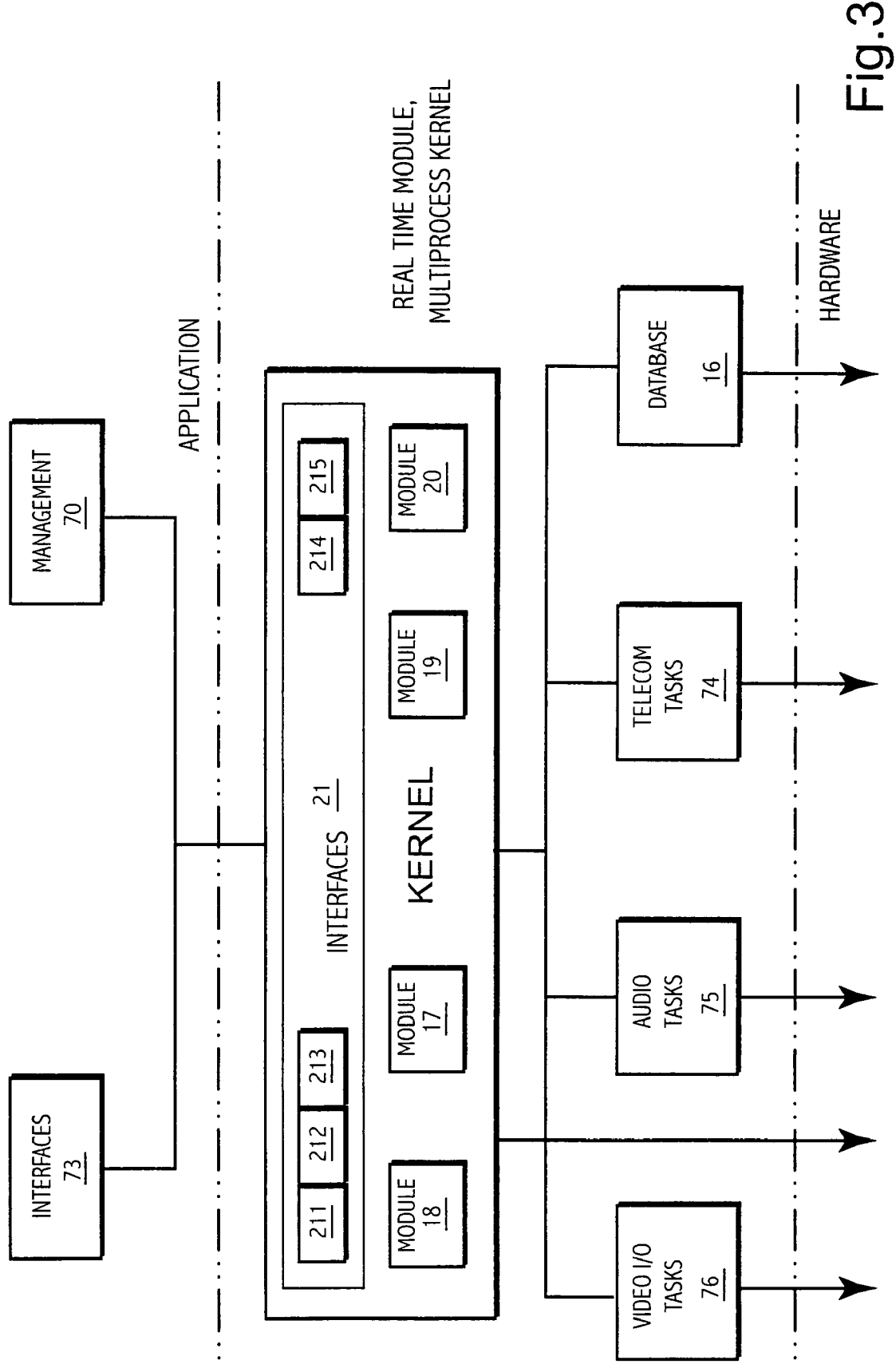
FIG. 3 shows the organization of the multitask system managing the hardware and software.

This multitask operating system is organized as shown in FIG. 3 around a kernel comprising a module (17) for resolving priorities between tasks, a task scheduling module (18), a module (19) for serialization of hardware used, and a process communications module (20). Each of the modules communicates with application programming interfaces (21) and database (16). There are as many programming interfaces as there are applications. Thus, module (21) includes a first programming interface (211) for remote control (101), a second programming interface (212) for liquid crystal screen (12), a third programming interface (213) for audio control circuit (110), a fourth programming interface (214) for video control circuit (111), and a fifth interface (215) for telecommunications control circuit (104).

Five tasks with a decreasing order of priority are managed by the kernel of the operating system, the first (76) for the video inputs/outputs has the highest priority, the second (75) of level two relates to audio, the third (74) of level three to telecommunications, the fourth (73) of level four to interfaces and the fifth (70) of level five to management. These orders of priority will be considered by priority resolution module (17) as and when a task appears and disappears. Thus, as soon as a video task appears, the other tasks underway are suspended, priority is given to this task and all the system resources are assigned to the video task. At the output, video task (76) is designed to unload the video files from optional mass memory (108) alternately to one of two buffers (111, 1112), while the other buffer (1112 or 1111) is used by video controller circuit (111) to produce the display after data decompression. At the input, video task (76) is designed to transfer data received in telecommunications buffer (1041) to the static RAM of the CPU. It is the same for audio task (110) on the one hand at the input between telecommunications buffer (1041), and mass memory (108) and on the other hand at the output between mass memory (108) and one of two buffers (1101, 1102) of audio controller circuit (110).

Figure 4:
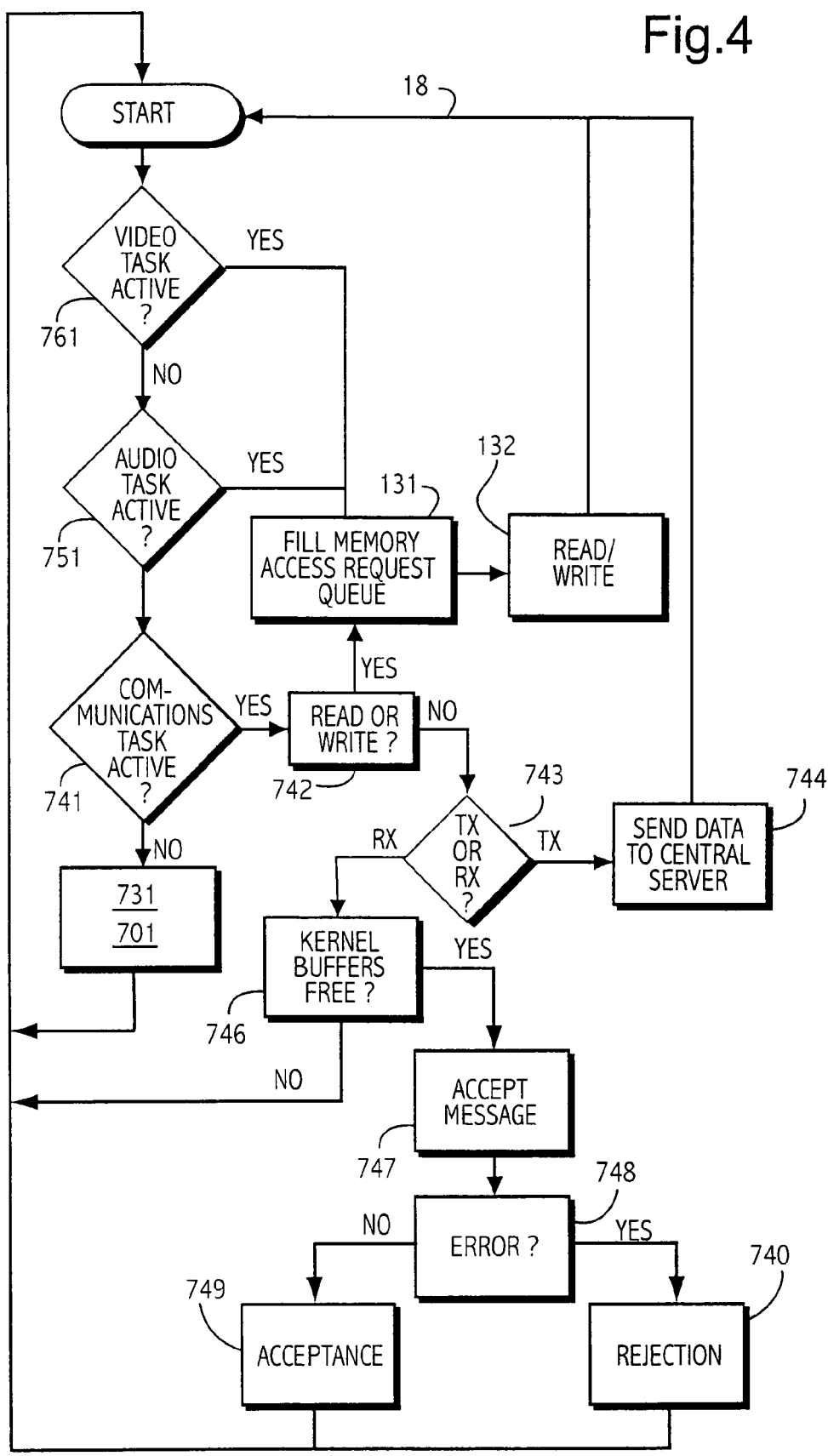
FIG. 4 shows a flowchart describing the operation of the multitask operating system.

Task scheduling module (19) will now be described in conjunction with FIG. 4. In the order of priority this module performs first test (761) to determine if the video task is active, i.e, if one of video buffers (1111, 1112) is empty. In the case of a negative response the task scheduling module passes to the following test which is second test (751) to determine if the audio task is active, i.e, if one of video buffers (1101, 1102) is empty. In the case of a negative response, third test (741) determines if the communication task is active, i.e., if buffer (1041) is empty. After a positive response to one of the tests, task scheduling module (18) at stage (131) fills the memory access request queue and at stage (132) executes this request by reading or writing between the mass memory or CPU memory and the buffer corresponding to the active task, then loops back to the first test. When test (741) on communications activity is affirmative, scheduler (18) performs test (742) to determine if it is a matter of reading or writing data in the memory. If yes, the read or write request is placed in a queue at stage (131). In the opposite case, the scheduler determines at stage (743) if it is transmission or reception and in the case of transmission sends by stage (744) a block of data to the central server. In the case of reception the scheduler verifies at stage (746) that the kernel buffers are free for access and in the affirmative sends a message to the central server to accept reception of a data block at stage (747). After receiving a block, error control (748) of the cyclic redundancy check type (CRC) is executed. The block is rejected at stage (740) in case of error, or accepted in the opposite case at stage (749) by sending a corresponding message to the central server indicating that the block bearing a specific number is rejected or accepted, then loops back to the start tests. When there is no higher level task active, at stage (731 or 701) the scheduler processes interface or management tasks.

The kernel is occupied with rotation of the execution of tasks according to their priority and of communications between them. A task which manages video, one which manages audio, another which manages telecommunications and a last one which manages databanks are transferred to the kernel. Communications between the task and the kernel takes place by a common programming interface.

The number and type of active tasks is indicated to scheduler (18) by execution of selection management module SPMM whose flowchart is shown in FIG. 6. The management exercised by this module begins with test (61) to determine if selections are in the queue.

Consequently, if test (61) on the queue determines that selections are waiting, when a user chooses a title he wishes to hear, it is automatically written in a queue file of a nonvolatile memory of the system, such as the static battery backed-up RAM.

Thus, no selection made will ever be lost in case of an electrical failure. The system plays (reproduces) the selection in its entirety before removing it from the queue file.

When the selection has been reproduced in its entirety, it is removed from the queue file and the system checks if there are others in the queue file. If there is another, the system immediately starts to play the selection.

The total time transpired between the end of one selection and the start of the next is less than 0.5 seconds.

Processing is continued by test (65) to determine if the selection contains an audio scenario. If yes, at stage (651) this scenario is written in the queue of tasks of scheduler (18). If not, or after this entry, processing is continued by test (66) to determine if the selection contains moving images. If yes, the video scenario is written at stage (661) in the queue of tasks of scheduler (18). If no or if yes after this entry, processing is continued by test (64) to determine if the selection contains still graphics. If yes, at stage (641) this graphical presentation scenario is written in the queue of tasks of scheduler (18). If no or if yes after this entry, processing is continued by test (63) to determine if the selection contains a publicity scenario. If yes, at stage (631) the scenario is written in the queue of tasks of scheduler (18). Thus, scheduler (18) notified of uncompleted tasks can manage the progression of tasks simultaneously.

Due, on the one hand, to the task management mode assigning highest priority to the video task, on the other hand, to the presence of hardware or software buffers assigned to each of the tasks for temporary storage of data and the presence of status buffers relative to each task, it has been possible to have all these tasks managed by a single central unit with a multitask operating system which allows video display, i.e., moving images compared to a graphics representation in which the data to be processed are less complex.

Moreover, the multitask operating system which includes a library containing a set of tools and services greatly facilitates operation by virtue of its integration in the storage and the resulting high flexibility. In particular, for this reason it is possible to create a multimedia environment by simply and efficiently managing audio reproduction, video or graphics display and video animation. In addition, since the audiovisual data are digitized and stored in the storage, much less space is used than for a traditional audiovisual reproduction system and consequently the congestion of the system according to the invention is clearly less. Database (16) is composed, as shown in FIG. 7, of several bases.

A first (161) with the titles of the audiovisual pieces, second (162) with the artists, third (163) with the labels, fourth (164) with albums, fifth (165) with the words of karaoke selections. First base (161) contains first item (1611) giving the title of the piece, second item (1612) giving the identification of the product, this identification being unique. Third item (1613) makes it possible to recognize the category, i.e., jazz, classical, popular, etc. Fourth item (1614) indicates the date of updating. Fifth item (1615) indicates the length in seconds for playing the piece.

Sixth item (1616) is a link to the karaoke base. Seventh item (1617) is a link to the album. Eighth item (1618) is a link to the labels. Ninth item (1619) gives the purchase price for the user.

Tenth item (1610) is a link to the artist database. This link is composed of the identity of the artist. The artist database includes, besides the identity of the artist composed of item (1621), second item (1622) composed of the name of the artist or name of the group. The labels database includes first item (1631) composed of the identity of the label, establishing the link to eighth item (1618) of the title database, and second item (1632) composed of the name of the label. The album database contains a first item which is the identity of the album (1641) which constitutes the link to seventh item (1617) of the title base. Second item (1642) comprises the title, third item (1643) is composed of the date of updating of the album, and the fourth item (1644) is composed of the label identity. The karaoke base is composed of first item (1651) giving the identity of the title and corresponds to sixth item (1616) of the title base. Second item (1652) comprises for each title a file of each syllable and the time expired since the start of the song and at the end of which the singer must pronounce the syllable to have appear on the screen displaying the phrases to be sung as a marker indicating the syllable at the instant determined by a timer. The timer is started at the time of karaoke use by the start of execution of the digital data of the music and counts up in rhythm with the processor clock which is likewise the time base for the music and the audio controller card.

It is easily understood that database (16) thus makes it possible to notify the user of the costs and particulars for each of the artists or groups of artists whose songs and videos are being performed, and to display the words necessary to the user of the apparatus in the karaoke mode.

Figure 5A:
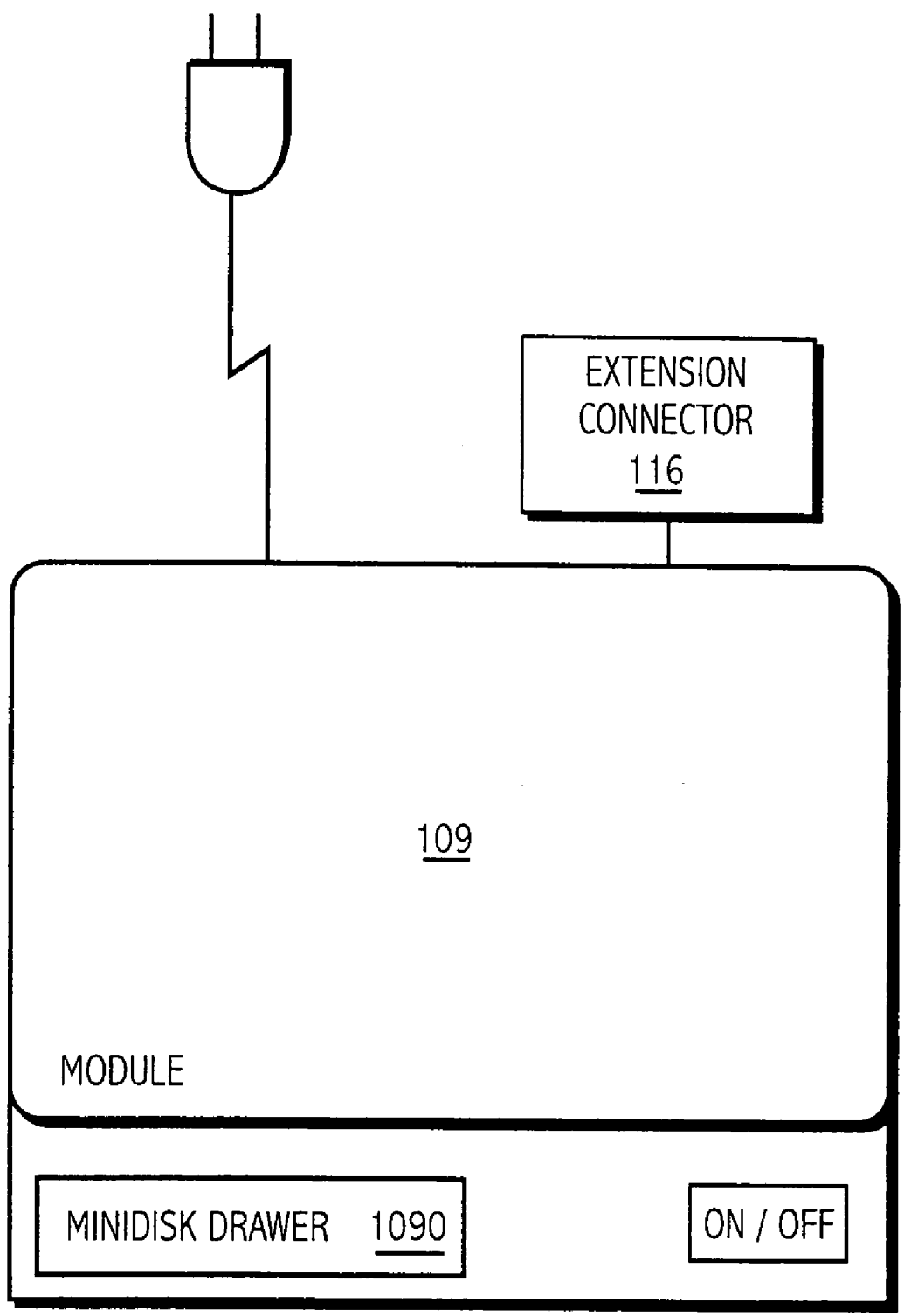
FIG. 5A shows a first version of the extension of the module for the apparatus of FIG. 1.
Figure 5B:
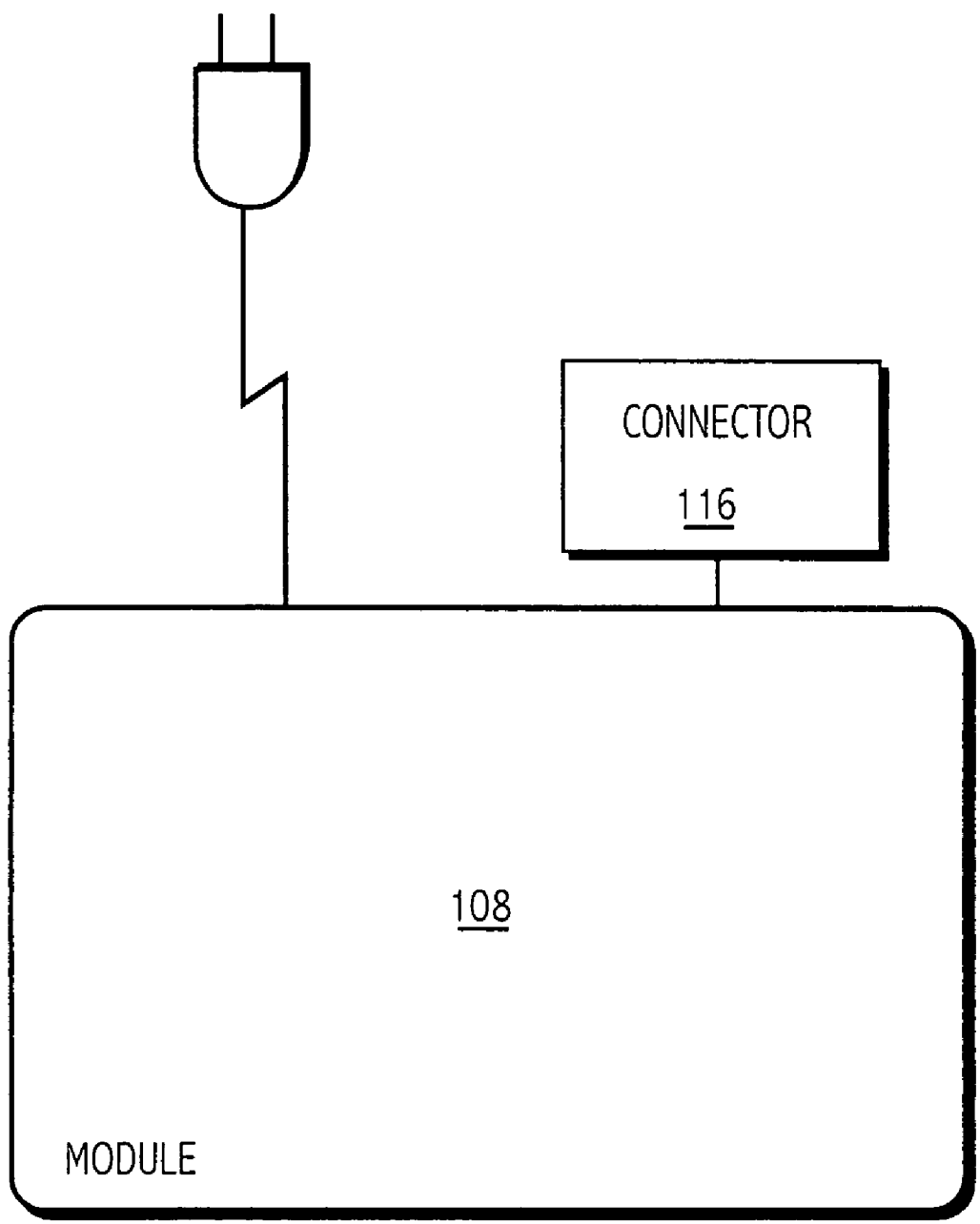
FIG. 5B shows a second version of the extension module for the apparatus of FIG. 1.

Finally, in one of the two versions of the invention, a first recording module corresponding to the representation in FIG. 5A can be added to the primary system shown in FIG. 1. This recording module is connected by extension connector (116) to primary module (1) and on the other hand by a socket to the electric grid. This module (109) is in fact a recording module which allows for example recording on a mini magnetooptical disk of one or more audiovisual pieces transferred to this medium via extension controller card (107) and extension connector (116) to device (109) which is able to operate with a SCSI/2 type bus. This thus makes it possible to consequently obtain mini magnetooptical disks (1090) on which the desired audiovisual pieces have been recorded for use on another player such as a car radio or any other equivalent device. In this example we have taken a mini magnetooptical disk unit, but this medium could be replaced very easily by digital tape recording allowing no loss of audio quality of the data recorded and operation on the marketed components of a stereo system or car radio.

Finally, the user can add to his central component (1) another module (108) which is composed of an external storage unit which can be comprised of a hard disk system or any other equivalent system allowing the user to store several audiovisual pieces, whereas primary system (1) can only store in its non-volatile memory a limited number of pieces; this number is limited by the size of the battery backed-up static RAM which participates equally in operation of primary unit (1).

Operation is as follows:
a) listening

The user begins by connecting the jukebox to his stereo system and his TV set, then turns them on.

If he wants to hear or view a video, he presses the "action" function of the remote control to obtain the selection screen. Using the search options he makes his choice and begins playback. The new choice is queued if there is already an active piece.

A liquid crystal screen on the apparatus allows sequential access to a list in alphabetical order. A "play" button (1028) starts playback.

With the remote control or control buttons (1026 to 1031) the user can pause, stop, read, rewind, fast forward, or skip to the following title.

He can ask the system to play all the pieces in sequence or randomly.
b) at purchase From the selection screen the acquisition screen is accessed. To purchase a title, the system demands the personal identification number (PIN). PIN use protects parents against wrongful billing which their children may cause. In this screen the user can purchase one or more musical pieces which have been offered to him based on a list which is resident in the apparatus and which is updated during communication with the distribution server center. Search on this list takes place by title, artist, category, alphabetical order and by release date. The cost of each piece is displayed as well as the total bill. Then he indicates to the system that he has finished making choices. The system then checks if there is enough memory to accommodate all the requested pieces. If there is a problem, the system advises the customer thereof, otherwise it requests the credit card number of the customer or displays it if it is already in the memory. Then the system attempts to reconnect to the server center to complete the transaction either by phone line or satellite link or by dedicated line. Since the system is a multitask system, it can even play the audiovisual pieces during transfer.
c) by its telecommunications card each apparatus can be connected to a server center. This possibility allows a flexibility which cannot be equalled by other, similar apparatus. It allows:

remote repair for minor problems,
assistance to a technician in locating the defective part or parts,
purchase of musical pieces without having to leave home, choosing only musical pieces of interest to us,
access to an impressive list of musical pieces which are not always available at the record shop,
updating or modification of the software.

When a software update is received, this new version will be used the next time the system is used.

It is also possible to include advertising on the screens. This advertising can be changed each time the system is connected to the server center.

Audio and video will be digitized using commercial software which uses standard file formats.

Digital audio and video data will be kept according to a standard compressed format. They will be decompressed during reproduction. The purpose of this is to minimize use of memory space and shorten the time of transfer to the server center.

The server center, since it is a computer, validates the credit card and bills the customer automatically without manual intervention and can answer several calls at the same time.

Any modification by one skilled in the art is likewise part of the invention. Thus, regarding buffers, it should be remembered that they can be present either physically in the circuit to which they are assigned or implemented by software by reserving storage space.

The invention claimed is:

1. A modular home jukebox, connectable to a remote server for downloading audio selections for reproduction, comprising:
   a main unit, including connectors for connection to an existing stereo and TV, the existing stereo and TV being separate from the modular home jukebox;
   a plurality of control buttons arranged on the main unit;
   a remote control configured to communicate with the main unit;
   a networking connection, provided to the main unit and configured to interface with an existing network to connect to the remote server;
   a display device, arranged on the main unit and configured to display at least playback and ordering information; and
   a storage device, provided as part of the main unit, to at least temporarily store a plurality of downloaded songs and queue the songs for playback via the modular home jukebox,
   wherein activation of at least one of the control buttons causes a display to be shown on the TV, the display including options for downloading audio selections and enabling a user to sort audio selections by genre and artist.

2. The modular home jukebox of claim 1, further comprising a modular recording device, configured to record data onto a portable medium, connected to said main unit, wherein the modular recording device is controllable by commands input into said main unit using either or both of said control buttons and said remote, and wherein said portable medium is playable via an existing audio playback system separate from and of a different type than said modular home jukebox.

3. The modular home jukebox of claim 1, further comprising a modular storage device configured to store at least one downloaded song for playback during a user session different than the user session during which the songs were downloaded, wherein storage of the at least one song is caused in response to commands input into said main unit using either or both of said control buttons and said remote.

4. The modular home jukebox of claim 1, wherein at least one of said control buttons is designated as a button for ordering a selection, and wherein pressing said button causes transmission of user purchasing information.

5. The modular home jukebox of claim 4, wherein the user purchasing information is credit card information.

6. The modular home jukebox of claim 4, wherein the user purchasing information is an account number of an account to be charged.

7. A method of ordering songs for playback on a modular home jukebox system including a main unit having a display device thereon and being configured to connect to a remote server and to a TV external thereto, the method comprising:

activating, via the modular home jukebox system, a song selection menu in response to a user pressing, on a remote, a button corresponding to a menu activation instruction, the activating causing a selection menu for selecting at least one audio selection to be displayed on the TV;

receiving, in response to a first selection made by the remote, an indication of a song for download from the remote server;

receiving, in response to a second selection made by the remote, a purchase instruction for the song for download; and receiving the song for download at the modular home jukebox system and at least temporarily storing the song for download for subsequent playback via the modular home jukebox system.

8. The method of claim 7, further comprising transmitting identification information identifying the purchaser of the song.

9. The method of claim 7, further comprising transmitting purchase method information identifying a payment medium for purchase of the song.

10. The method of claim 7, further comprising:

connecting a modular medium recorder to the main unit to record the song for download to a portable medium, the portable medium being playable in at least one different audio reproduction device type different from the modular home jukebox system; and receiving, at the main unit and from the remote control, an instruction to record the song for download to the portable medium, in response to a menu displayed on the TV.

11. The method of claim 7, further comprising establishing a connection to a remote service center.

12. The method of claim 11, further comprising, following said establishing, receiving remote repair instructions for problems on the modular home jukebox system.

13. The method of claim 11, further comprising, following said establishing, receiving software updates from the remote service center.

14. The method of claim 13, further comprising activating received software updates when the modular home jukebox system is next used.

15. The method of claim 7, further comprising causing advertisements to be displayed on the TV and/or the display device.

16. The method of claim 15, further comprising causing the advertisements to be displayed on the TV and/or the display device after the modular home jukebox system connects to a remote service center.

17. The method of claim 7, wherein the modular home jukebox system is connected to a remote service center, the remote service center being configured to process purchase instructions from the modular home jukebox system.

18. The method of claim 17, wherein the remote service center is configured to process purchase instructions from the modular home jukebox system by validating a credit card of the user of the modular home jukebox system and billing the user automatically without manual intervention.

* * * * *